(12) United States Patent
Cai

(10) Patent No.: US 12,411,786 B2
(45) Date of Patent: Sep. 9, 2025

(54) DATA REMOTE TRANSMISSION AND CHARGING CIRCUIT APPLIED TO VR DEVICE AND DEVICE THEREOF

(71) Applicant: SHENZHEN DEONE INNOVATION TECHNOLOGY CO., LTD, Shenzhen (CN)

(72) Inventor: Jiongjun Cai, Shenzhen (CN)

(73) Assignee: SHENZHEN DEONE INNOVATION TECHNOLOGY CO., LTD, Shenzhen (CN)

( * ) Notice: Subject to any disclaimer, the term of this patent is extended or adjusted under 35 U.S.C. 154(b) by 404 days.

(21) Appl. No.: 18/297,195

(22) Filed: Apr. 7, 2023

(65) Prior Publication Data

US 2024/0104039 A1    Mar. 28, 2024

(30) Foreign Application Priority Data

Sep. 26, 2022  (CN) .......................... 202222536193.5

(51) Int. Cl.
  *G06F 13/38* (2006.01)
  *G06F 13/42* (2006.01)
  *H02J 7/00* (2006.01)

(52) U.S. Cl.
  CPC ........ *G06F 13/382* (2013.01); *G06F 13/4282* (2013.01); *H02J 7/007* (2013.01); *G06F 2213/0042* (2013.01)

(58) Field of Classification Search
  CPC ............... G06F 13/382; G06F 13/4282; G06F 2213/0042; H02J 7/007
  See application file for complete search history.

(56) References Cited

U.S. PATENT DOCUMENTS

| 2015/0193167 A1* | 7/2015 | Hokari | G06F 13/4004 |
| | | | 711/115 |
| 2016/0357235 A1* | 12/2016 | Messenger | G06F 1/28 |
| 2021/0313822 A1* | 10/2021 | Wan | H02J 7/02 |

FOREIGN PATENT DOCUMENTS

| CN | 108271092 B | * 12/2019 | ......... G06F 13/4068 |
| CN | 112886656 B | * 6/2024 | ......... H02J 7/00032 |

* cited by examiner

*Primary Examiner* — Zhitong Chen
(74) *Attorney, Agent, or Firm* — HOWARD M COHN and Associates, LLC

(57) ABSTRACT

A data remote transmission and charging circuit applied to a VR device and a data remote transmission and charging device include a first data sending and receiving circuit, a hub circuit, a second data sending and receiving circuit, a voltage stabilizing circuit, a boost circuit, and a charging circuit. The first data sending and receiving circuit is electrically connected to a data source terminal and the hub circuit. The hub circuit is electrically connected to the second data sending and receiving circuit and the voltage stabilizing circuit. The second data sending and receiving circuit is electrically connected to the VR device and the boost circuit. The voltage stabilizing circuit is electrically connected to the boost circuit. The boost circuit is electrically connected to the charging circuit. By providing above structure, data remote transmission between the data source terminal and the VR device is realized.

9 Claims, 3 Drawing Sheets

DATA REMOTE TRANSMISSION AND CHARGING CIRCUIT APPLIED TO VR DEVICE AND DEVICE THEREOF

TECHNICAL FIELD

The present disclosure relates to a technical field of virtual reality (VR) devices, and in particular to a data remote transmission and charging circuit applied to a VR device and a data remote transmission and charging device.

BACKGROUND

In recent years, arising of virtual reality (VR) technology has made a combination of virtual and reality possible and brings people an unprecedented novelty experience. With development of the VR technology, an interaction between people and intelligent terminals (VR devices) becomes more and more frequent, and popularity of the VR devices makes aspects of people's lives convenient. In the prior art, when playing a VR game, a VR device and a data source (e.g., a computer) transmit data through a data line. During a game process, the charging protocol of the VR device is closed, and thus the VR device is unable to be charged while playing the game. Moreover, when a length of the data line exceeds 3 meters, there is wire voltage drop loss, which continuously consumes storage power in the VR device. When the storage power in the VR device is run out, a user can no longer play the game.

Therefore, how to provide a device that can be applied to the VR devices so that the VR devices can be charged while playing the game is a pressing problem for those skilled in the art to solve.

SUMMARY

In view of this, the present disclosure provides a data remote transmission and charging circuit applied to a VR device and a data remote transmission and charging device applied to the VR device.

By arrangements of a first data sending and receiving circuit, the hub circuit, the second data sending and receiving circuit, a voltage stabilizing circuit, a voltage boost circuit, and a charging circuit, data remote transmission between a data source terminal and the VR device is realized, and charging of the VR device in a game state is realized.

In a first aspect, the present disclosure provides the data remote transmission and charging circuit applied to the VR device. The data remote transmission and charging circuit comprises a first data sending and receiving circuit, a hub circuit, a second data sending and receiving circuit, a voltage stabilizing circuit, a boost circuit, and a charging circuit.

The first data sending and receiving circuit is electrically connected to a data source terminal and the hub circuit. The first data sending and receiving circuit is configured to obtain first game data from the data source terminal and send the first game data to the hub circuit. The first data sending and receiving circuit is configured to receive second game data from the hub circuit.

The hub circuit is electrically connected to the second data sending and receiving circuit and the voltage stabilizing circuit. The hub circuit is configured to obtain the first game data, perform data processing on obtained first game data, and send processed first game data to the second data sending and receiving circuit. The hub circuit is configured to store first charging protocol data and obtain second charging protocol data and second game data sent by the second data sending and receiving circuit. The hub circuit is configured to match the second charging protocol data with the first charging protocol data. If the second charging protocol data is matched with the first charging protocol data, the hub circuit sends a charging trigger signal to the charging circuit. If the second charging protocol data is not matched with the first charging protocol data, the hub circuit does not send the charging trigger signal to the charging circuit, performs data processing on obtained second game data, and sends processed second game data to the first data sending and receiving circuit.

The second data sending and receiving circuit is electrically connected to the VR device and the boost circuit. The second data sending and receiving circuit is configured to obtain the processed first game data sent from the hub circuit. The second data sending and receiving circuit is configured to obtain the second charging protocol data and the second game data from the VR device and send the second charging protocol data and the second game data to the hub circuit.

The voltage stabilizing circuit is electrically connected to the boost circuit and is configured to stabilize a voltage of the hub circuit.

The boost circuit is electrically connected to the charging circuit and is configured to raise a voltage of the VR device.

The charging circuit is configured to receive the charging trigger signal sent by the hub circuit and trigger the boost circuit into a boost working state.

Furthermore, the boost circuit comprises a direct current to direct current (DC-DC) boost chip and a diode. An output end of the DC-DC boost chip is electrically connected to an input end of the voltage stabilizing circuit and a power supply end of the second data sending and receiving circuit. An input end of the DC-DC boost chip is electrically connected to a power supply end of the charging circuit. A ground (GND) end of the DC-DC boost chip is grounded. An anode of the diode is electrically connected to a power supply end of the first data sending and receiving circuit. A cathode of the diode is electrically connected to the output end of the DC-DC boost chip.

Furthermore, the voltage stabilizing circuit comprises a low dropout regulator (LDO) voltage stabilizing chip. An output end of the LDO voltage stabilizing chip is electrically connected to a power supply end of the hub circuit. An input end of the LDO voltage stabilizing chip is electrically connected to the output end of the DC-DC boost chip and the power supply end of the second data sending and receiving circuit. A GND end of the LDO voltage stabilizing chip is grounded.

Furthermore, the hub circuit comprises a hub chip, and the hub chip has a model number of RTS5411.

Furthermore, the DC-DC boost chip has a model number of MT3608.

Furthermore, the LDO voltage stabilizing chip has s model number of PW6206.

Furthermore, a voltage value of the voltage stabilizing circuit ranges from 3-5.2 V.

Furthermore, a voltage value of the charging circuit ranges from 4.9-5.6 V.

In a second aspect, the present disclosure provides the data remote transmission and charging device. The data remote transmission and charging device comprises the data remote transmission and charging circuit mentioned above. The data remote transmission and charging circuit is configured to realize data remote transmission between the data source terminal and the VR device; the data remote transmission and charging circuit is configured to charge the VR device.

Compared with the prior art, in the data remote transmission and charging circuit and the data remote transmission and charging device of the present disclosure, by providing the first data sending and receiving circuit, the hub circuit, the second data sending and receiving circuit, the voltage stabilizing circuit, the boost circuit, and the charging circuit, the first data sending and receiving circuit is electrically connected to the data source terminal and the hub circuit, the hub circuit is electrically connected to the second data sending and receiving circuit and the voltage stabilizing circuit, and the second data sending and receiving circuit is electrically connected to the VR device, realizing the data remote transmission between the data source terminal and the VR device. Further, the boost circuit is electrically connected to the second data sending and receiving circuit, the voltage stabilizing circuit, and the charging circuit, so real-time charging of the VR device is realized when playing a VR game.

DETAILED DESCRIPTION

To facilitate a good understanding of purposes, structures, features, and efficacy, etc. of the present disclosure, a data remote transmission and charging circuit applied to a virtual reality (VR) device and a device thereof disclosed herein are further described in conjunction with the accompanying drawings and specific embodiments.

Figure 1:
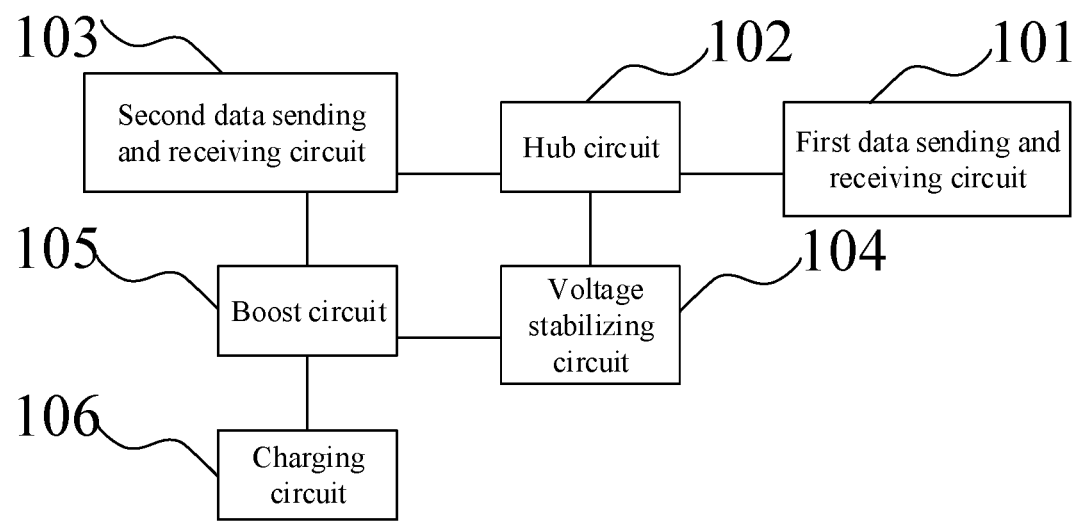
FIG. 1 is a schematic diagram of a data remote transmission and charging circuit applied to a virtual reality (VR) device according to one embodiment of the present disclosure.

As shown in FIG. 1, the present disclosure provides the data remote transmission and charging circuit applied to the VR device. The data remote transmission and charging circuit comprises a first data sending and receiving circuit 101, a hub circuit 102, a second data sending and receiving circuit 103, a voltage stabilizing circuit 104, a boost circuit 105, and a charging circuit 106.

The first data sending and receiving circuit 101 is electrically connected to a data source terminal and the hub circuit 102. The first data sending and receiving circuit 101 is configured to obtain first game data from the data source terminal and send the first game data to the hub circuit 102. The first data sending and receiving circuit 101 is configured to receive second game data from the hub circuit 102.

The hub circuit 102 is electrically connected to the second data sending and receiving circuit 103 and the voltage stabilizing circuit 104. The hub circuit 102 is configured to obtain the first game data, perform data processing on obtained first game data, and send processed first game data to the second data sending and receiving circuit 103. Further, the hub circuit 102 is configured to store first charging protocol data and obtain second charging protocol data and second game data sent by the second data sending and receiving circuit 103. The hub circuit 102 is configured to match the second charging protocol data with the first charging protocol data. If the second charging protocol data is matched with the first charging protocol data, the hub circuit sends a charging trigger signal to the charging circuit. If the second charging protocol data is not matched with the first charging protocol data, the hub circuit does not send the charging trigger signal to the charging circuit 103. The hub circuit 102 performs data processing on obtained second game data, and sends processed second game data to the first data sending and receiving circuit.

The second data sending and receiving circuit 103 is electrically connected to the VR device and the boost circuit 105. The second data sending and receiving circuit 103 is configured to obtain the processed first game data sent from the hub circuit 102. The second data sending and receiving circuit 103 is configured to obtain the second charging protocol data and the second game data from the VR device and send the second charging protocol data and the second game data to the hub circuit 102.

The voltage stabilizing circuit 104 is electrically connected to the boost circuit 105 and is configured to stabilize a voltage of the hub circuit 102.

The boost circuit 105 is electrically connected to the charging circuit 106 and is configured to raise a voltage of the VR device.

The charging circuit 106 is configured to receive the charging trigger signal sent by the hub circuit 102 and trigger the boost circuit into a boosted working state.

In the embodiment, the first data sending and receiving circuit 101 is electrically connected to the data source terminal and the hub circuit 102, the hub circuit 102 is electrically connected to the second data sending and receiving circuit 103 and the voltage stabilizing circuit 104, and the second data sending and receiving circuit 103 is electrically connected to the VR device, which realizes the data remote transmission between the data source terminal and the VR device. Further, the boost circuit 105 is electrically connected to the second data sending and receiving circuit 103, the voltage stabilizing circuit 104, and the charging circuit 106, so real-time charging of the VR device is realized when playing a VR game.

Figure 2:
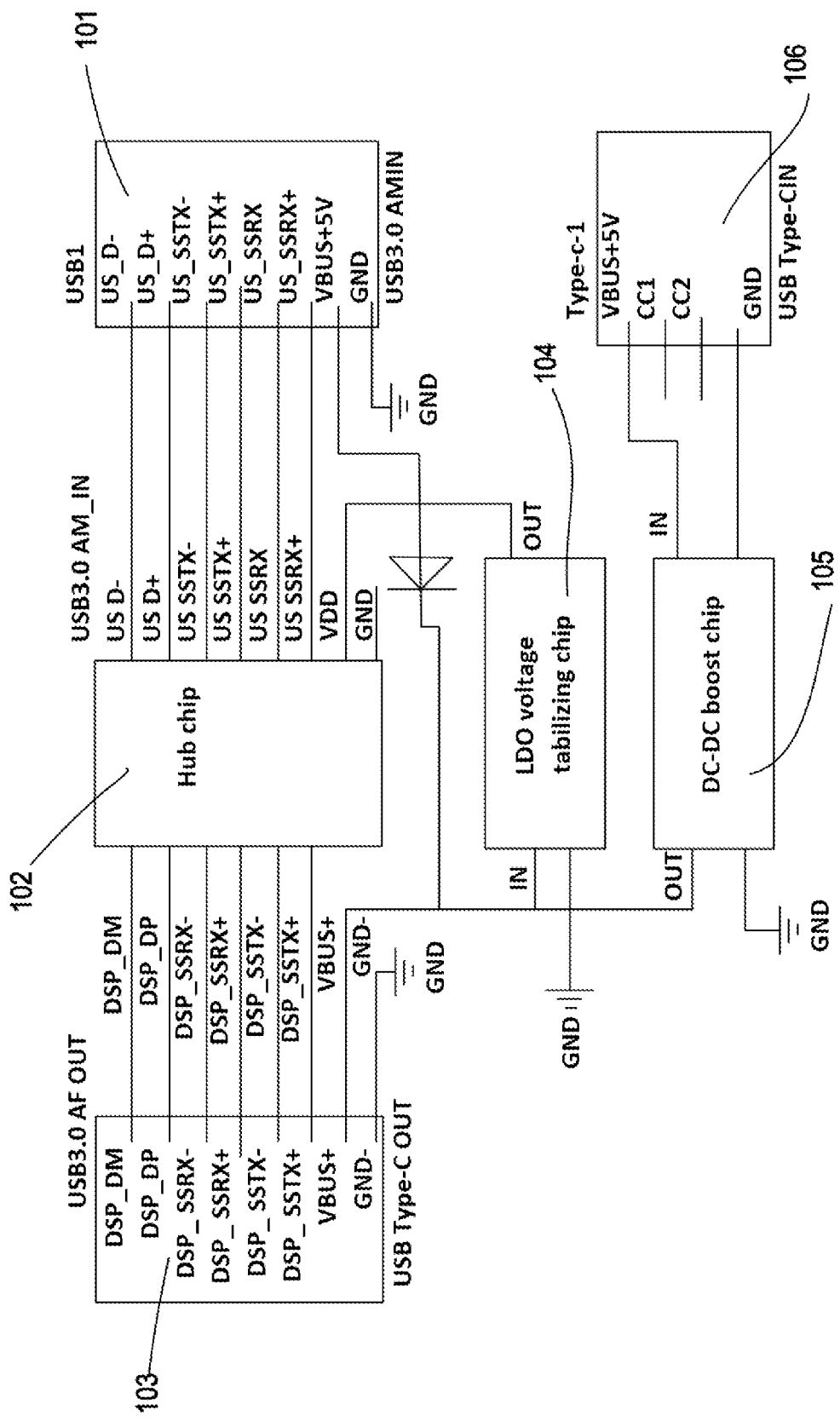
FIG. 2 is a schematic diagram of the data remote transmission and charging circuit applied to the VR device according to another embodiment of the present disclosure.

As shown in FIG. 2, the boost circuit 105 comprises a DC-DC boost chip and a diode. An output end of the DC-DC boost chip is electrically connected to an input end of the voltage stabilizing circuit 104 and a power supply end of the second data sending and receiving circuit 103. An input end of the DC-DC boost chip is electrically connected to a power supply end of the charging circuit 106. A ground (GND) end of the DC-DC boost chip is grounded. An anode of the diode is electrically connected to a power supply end of the first data sending and receiving circuit. A cathode of the diode is electrically connected to the output end of the DC-DC boost chip. An arrangement of the diode effectively prevents a voltage of the charging circuit 106 from being too large, so that a current would not flow backwards through the first data sending and receiving circuit 101 to the data source terminal, and the data source terminal is prevented from burning out. In one optional embodiment, the DC-DC boost chip has a model number of MT3608.

The voltage stabilizing circuit 104 comprises a low dropout regulator (LDO) voltage stabilizing chip. An output end of the LDO voltage stabilizing chip is electrically connected to a power supply end of the hub circuit. An input end of the LDO voltage stabilizing chip is electrically connected to the output end of the DC-DC boost chip and the power supply end of the second data sending and receiving circuit 103. A GND end of the LDO voltage stabilizing chip is grounded.

In one optional embodiment, the LDO voltage stabilizing chip has s model number of PW6206.

The hub circuit 102 comprises a hub chip. In one optional embodiment, the hub chip has a model number of RTS5411.

In the embodiment, the first data sending and receiving circuit 101 further comprises a US_D− end, a US_D+ end, a US_SSTX− end, a US_SSTX+ end, a US_SSRX end, and a US_SSRX+ end.

The hub chip comprises a US_D− end, a US_D+ end, a US_SSTX− end, a US_SSTX+ end, a US_SSRX end, a US_SSRX+ end, a USP_DM end, a USP_DP end, a USP_SSRX− end, a USP_SSRX+ end, a USP_SSTX− end, and a USP_SSTX+ end.

The second data sending and receiving circuit 103 also comprises a USP_DM end, a USP_DP end, a USP_SSRX− end, a USP_SSRX+ end, a USP_SSTX− end, and a USP_SSTX+ end.

The US_D− end of the first data sending and receiving circuit 101 is electrically connected with the US_D− end of the hub chip. The US_D+ end of the first data sending and receiving circuit 101 is electrically connected with the US_D+ end of the hub chip. The US_SSTX− end of the first data sending and receiving circuit 101 is electrically connected with the US_SSTX− end of the hub chip. The US_SSTX+ end of the first data sending and receiving circuit 101 is electrically connected with the US_SSTX+ end of the hub chip. The US_SSRX− end of the first data sending and receiving circuit 101 is electrically connected with the US_SSRX− end of the hub chip. The US_SSRX+ end of the first data sending and receiving circuit 101 is electrically connected with the US_SSRX+ end of the hub chip.

The USP_DM end of the second data sending and receiving circuit 103 is electrically connected with the USP_DM of the hub chip. The USP_DP end of the second data sending and receiving circuit 103 is electrically connected with the USP_DP of the hub chip. The USP_SSRX− end of the second data sending and receiving circuit 103 is electrically connected with the USP_SSRX− of the hub chip. The USP_SSRX+ end of the second data sending and receiving circuit 103 is electrically connected with the USP_SSRX+ of the hub chip. The USP_SSTX− end of the second data sending and receiving circuit 103 is electrically connected with the USP_SSTX− of the hub chip. The USP_SSTX+ end of the second data sending and receiving circuit 103 is electrically connected with the USP_SSTX+ of the hub chip.

In the embodiment, a voltage value of the hub chip of the hub circuit 102 ranges from 3-5.2 V. The voltage stabilizing circuit 104 is configured to stabilize the voltage of the hub circuit 102, so a voltage value of the voltage stabilizing circuit 104 ranges from 3-5.2V, which can be 3V, 3.2V, 3.5V, 4V, 4.8V, 5.1V, etc., and is not limited therein.

In the embodiment, a wire length between the second data sending and receiving circuit 103 and the hub circuit 102 ranges from 4-7 m. A wire length between the hub circuit 102 and the first data sending and receiving circuit 101 ranges from 0.1-1 m. A wire length between the boost circuit 105 and the charging circuit 106 ranges from 1-2 m. Therefore, in one optional embodiment of the present disclosure, a voltage value of the charging circuit 106 ranges from 4.9-5.6V and a current of the charging circuit 106 is 1.5 A. The charging circuit 106 compensates voltage lost in lengths of wires connected to the VR device and enables a voltage of the VR device to be output stably, thus allowing a user to stably play the VR game for a long time while allowing the charging of the VR device.

In the embodiment, an interface of the first data sending and receiving circuit 101 is a USB interface, an interface of the second data sending and receiving circuit 103 is a TYPE-C interface, and an interface of the charging circuit 106 is a TYPE-C interface.

A working process is as follow:

When a USB male connector (i.e., USB interface) of the first data sending and receiving circuit 101 is inserted into a USB female connector of a computer (i.e., the date source terminal), a TYPE-C male connector of the second data sending and receiving circuit 103 (i.e., TYPE-C interface of the second data sending and receiving circuit 103) is inserted into a TYPE-C female connector of the VR device, and a TYPE-C male connector of the charging circuit 106 (i.e., TYPE-C interface of the charging circuit 106) is inserted into the Type-c female connector of the charger.

At this time, the US_D− end, the US_D+ end, the US_SSTX− end, the US_SSTX+ end, the US_SSRX end, and the US_SSRX+ end of the hub chip send game data to the computer through the US_D− end, the US_D+ end, the US_SSTX− end, the US_SSTX+ end, the US_SSRX end, and the US_SSRX+ end of the first data sending and receiving circuit 101. The VR device sends the game data through the USP_DM end, the USP_DP end, the USP_SSRX− end, the USP_SSRX+ end, the USP_SSTX− end, and the USP_SSTX+ end of the second data sending and receiving circuit 103 to the USP_DM end, the USP_DP end, the USP_SSRX− end, the USP_SSRX+ end, the USP_SSTX− end, and the USP_SSTX+ end of the hub chip. Meanwhile, the USP_DM end and the USP_DP end of the hub chip communicate with a USP_DM end and a USP_DP end of the VR device for charging protocol. If the HUB chip is matched with the VR device through the charging protocol data, the charging circuit charges the VR device through boost circuit 105. If the hub chip is not matched with the VR device through the charging protocol data, the charging circuit does not charge the VR device.

Figure 3:
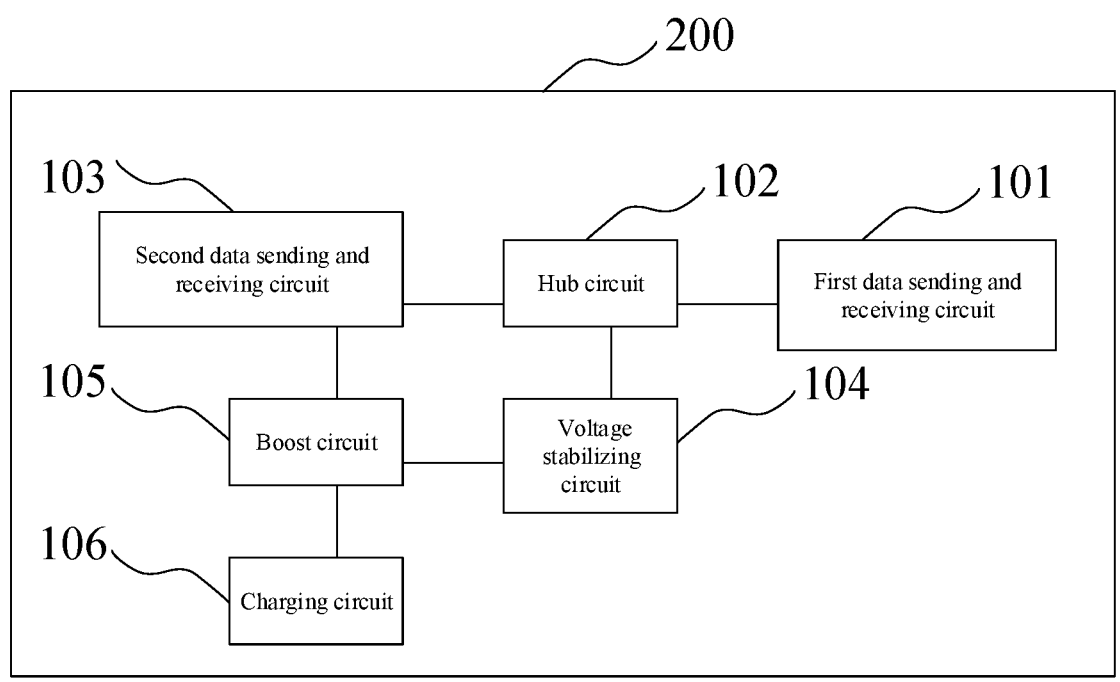
FIG. 3 is a schematic diagram of the data remote transmission and charging device applied to the VR device according to one embodiment of the present disclosure.

As shown in FIG. 3, the present disclosure provides the data remote transmission and charging device 200. The data remote transmission and charging device 200 comprises the data remote transmission and charging circuit as shown in FIGS. 1 and 2. The data remote transmission and charging device 200 is configured to realize data remote transmission between the data source terminal and the VR device; the data remote transmission and charging circuit is configured to charge the VR device.

In summary, in the data remote transmission and charging circuit and the data remote transmission and charging device of the present disclosure, by providing the first data sending and receiving circuit, the hub circuit, the second data sending and receiving circuit, the voltage stabilizing circuit, the boost circuit, and the charging circuit, the first data sending and receiving circuit is electrically connected to the data source terminal and the hub circuit, the hub circuit is electrically connected to the second data sending and receiving circuit and the voltage stabilizing circuit, and the second data sending and receiving circuit is electrically connected to the VR device, which realizes the data remote transmission between the data source terminal and the VR device. Further, the boost circuit is electrically connected to the second data sending and receiving circuit, the voltage stabilizing circuit, and the charging circuit, so the real-time charging of the VR device is realized when playing the VR game.

The above detailed descriptions are only illustrations of optional embodiments of the present disclosure and are not intended to limit the protection scope of the present disclo-

What is claimed is:

1. A data remote transmission and charging circuit applied to a virtual reality (VR) device, comprising:
 a first data sending and receiving circuit,
 a hub circuit,
 a second data sending and receiving circuit,
 a voltage stabilizing circuit,
 a boost circuit, and
 a charging circuit;
 wherein the first data sending and receiving circuit is electrically connected to a data source terminal and the hub circuit; the first data sending and receiving circuit is configured to obtain first game data from the data source terminal and send the first game data to the hub circuit; the first data sending and receiving circuit is configured to receive second game data from the hub circuit;
 wherein the hub circuit is electrically connected to the second data sending and receiving circuit and the voltage stabilizing circuit; the hub circuit is configured to obtain the first game data, perform data processing on obtained first game data, and send processed first game data to the second data sending and receiving circuit; the hub circuit is configured to store first charging protocol data and obtain second charging protocol data and second game data sent by the second data sending and receiving circuit; the hub circuit is configured to match the second charging protocol data with the first charging protocol data, if the second charging protocol data is matched with the first charging protocol data, the hub circuit is configured to sends a charging trigger signal to the charging circuit; if the second charging protocol data is not matched with the first charging protocol data, the hub circuit does not send the charging trigger signal to the charging circuit; and the hub circuit performs data processing on obtained second game data and sends processed second game data to the first data sending and receiving circuit;
 wherein the second data sending and receiving circuit is electrically connected to the VR device and the boost circuit; the second data sending and receiving circuit is configured to obtain the processed first game data sent from the hub circuit; the second data sending and receiving circuit is configured to obtain the second charging protocol data and the second game data from the VR device and send the second charging protocol data and the second game data to the hub circuit;
 wherein the voltage stabilizing circuit is electrically connected to the boost circuit and is configured to stabilize a voltage of the hub circuit;
 wherein the boost circuit is electrically connected to the charging circuit and is configured to raise a voltage of the VR device;
 wherein the charging circuit is configured to receive the charging trigger signal sent by the hub circuit and trigger the boost circuit into a boosted working state.

2. The data remote transmission and charging circuit according to claim 1, wherein the boost circuit comprises a DC-DC boost chip and a diode; an output end of the DC-DC boost chip is electrically connected to an input end of the voltage stabilizing circuit and a power supply end of the second data sending and receiving circuit; an input end of the DC-DC boost chip is electrically connected to a power supply end of the charging circuit; a ground (GND) end of the DC-DC boost chip is grounded; an anode of the diode is electrically connected to a power supply end of the first data sending and receiving circuit; a cathode of the diode is electrically connected to the output end of the DC-DC boost chip.

3. The data remote transmission and charging circuit according to claim 2, wherein the voltage stabilizing circuit comprises a low dropout regulator (LDO) voltage stabilizing chip; an output end of the LDO voltage stabilizing chip is electrically connected to a power supply end of the hub circuit; an input end of the LDO voltage stabilizing chip is electrically connected to the output end of the DC-DC boost chip and the power supply end of the second data sending and receiving circuit; and a GND end of the LDO voltage stabilizing chip is grounded.

4. The data remote transmission and charging circuit according to claim 1, wherein the hub circuit comprises a hub chip, and the hub chip has a model number of RTS5411.

5. The data remote transmission and charging circuit according to claim 2, wherein the DC-DC boost chip has a model number of MT3608.

6. The data remote transmission and charging circuit according to claim 3, wherein the LDO voltage stabilizing chip has s model number of PW6206.

7. The data remote transmission and charging circuit according to claim 1, wherein a voltage value of the voltage stabilizing circuit ranges from 3-5.2 V.

8. The data remote transmission and charging circuit according to claim 1, wherein a voltage value of the charging circuit ranges from 4.9-5.6 V.

9. A data remote transmission and charging device, comprising: the data remote transmission and charging circuit according to claim 1, wherein the data remote transmission and charging circuit is configured to realize data remote transmission between the data source terminal and the VR device; the data remote transmission and charging circuit is configured to charge the VR device.

* * * * *